May 21, 1940.  G. A. MOFFETT  2,201,868

REMOTE CONTROL SYSTEM

Filed May 10, 1934

Inventor:
Guy A. Moffett,
by Harry E. Dunham
His Attorney.

Patented May 21, 1940

2,201,868

UNITED STATES PATENT OFFICE 2,201,868

REMOTE CONTROL SYSTEM

Guy A. Moffett, Scotia, N. Y., assignor to General Electric Company, a corporation of New York Application May 10, 1934, Serial No. 724,844

10 Claims. (Cl. 171—229)

My invention relates to remote control systems.

It is an object of my invention to provide means responsive to predetermined closing and opening operations of a load circuit for controlling the source of supply to which said load circuit is connected.

It is another object of my invention to provide a remote control system in which the motor of a motor generator set is started and stopped in response to predetermined closing and opening operations of the load circuit connected to the generator of the motor generator set.

It is a further object of my invention to provide a power system in which a characteristic of a generator may be altered by momentarily closing the load circuit a predetermined number of times.

It is a further object of my invention to provide a system in which the operator may initiate the gradual raising or lowering of the voltage of a generator through the agency of a relay operable to a plurality of positions depending on the number of times it is energized by the repeated closing of the load circuit and through the agency of which this operation can be arrested at the option of the operator.

Figure 1:
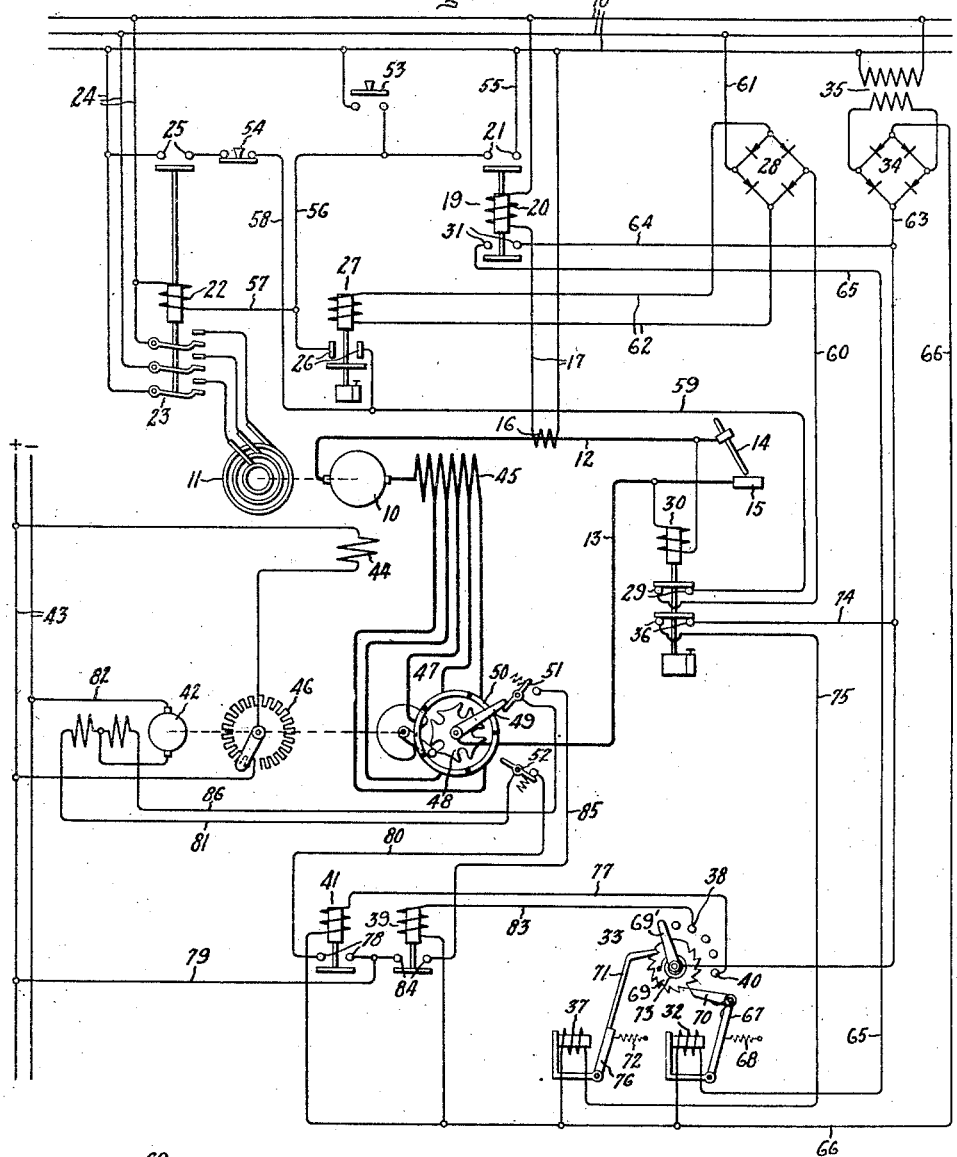
Figure 2:
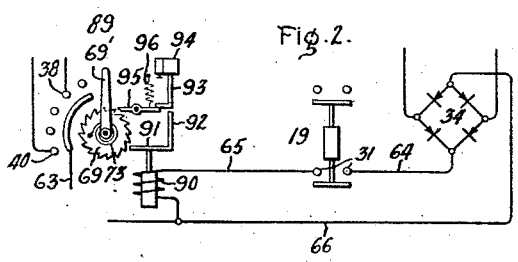

Further objects of my invention will become apparent from a consideration of the following description taken in connection with the accompanying drawing, Fig. 1 of which diagrammatically represents a system embodying my invention, and Fig. 2 of which illustrates a modification thereof.

The power system illustrated in Fig. 1 comprises a generator 10, a driving motor 11 mechanically connected thereto, and a load circuit 12, 13 electrically connected thereto. The load circuit is employed for connecting a load device to the generator and in the particular arrangement illustrated the load comprises a welding arc which may be established between an electrode 14 and the work 15.

When the load circuit 12, 13 is closed by placing the electrode 14 in engagement with the work 15 the secondary of a transformer 16 connected in this circuit is short circuited causing an increased flow of current in its primary circuit 17 which is connected to one phase of a polyphase source of supply 18. This increased flow of current operates a relay 19 by increasing the energization of its operating coil 20 which is connected in the primary circuit of the transformer 16. Relay 19 is responsive to the impedance of the load circuit by reason of its connection in a circuit the impedance of which is responsive to the impedance of the load circuit. When this relay closes its contacts 21 it completes a circuit through the operating coil 22 of a switch 23 by which the motor 11 is connected through conductors 24 to the source of supply 18. As soon as switch 23 closes it completes its holding circuit through its holding contacts 25 and the contacts 26 of a time element relay 27. This time element relay is of the delayed opening type and is energized through a rectifier 28 which is connected to one phase of the source 18 through contacts 29 of a relay 30. The relay 30 is operable to two positions one of which corresponds to normal voltage open circuit conditions of the load circuit 12, 13 and the other of which corresponds to short circuit or normal load conditions on said circuit.

The closure of the relay 19 also closes contacts 31 which connects the operating winding 32 of a relay 33 to the direct current terminals of a rectifier 34, the alternating current terminals of which are connected through a transformer 35 to one phase of the source of supply 18. Relay 30 when in the position it assumes when the load circuit 12, 13 is short circuited or connected to a load connects through its contacts 36 the reset winding 37 of relay 33 to the direct current terminals of the rectifier 34. Relay 30 has an instantaneous pick-up and time delay drop-out characteristic. This delay must exceed the time normally elapsing between successive tappings of electrode 14 to the work 15 by which an operator controls the generator 10 as will be described below. When the electrode 14 engages the work 15 relay 19 operates, closing contacts 31 which operates the relay 33. Because of its time delay drop-out characteristic the relay 30 will not close its contacts 36 through which the reset coil of the reset winding 37 of the relay 33 is energized until a predetermined time delay has occurred. Thus, the operator by tapping the electrode 14 to the electrode 15, and thus momentarily closing the load circuit 12, 13 a predetermined number of times, is able to operate the relay 33 to one of a plurality of positions depending upon the number of times the load circuit 12, 13 is closed. If, however, the operator closes the circuit for a predetermined period of time equal to the drop-out time of the relay 30 the relay 33 will be reset to its initial position.

When the relay 33 is operated to the position in which it completes a circuit through its contact 38 it energizes a relay 39, and when it is operated to a position in which it completes a circuit through its contact 40 it energizes a relay 41. The closure of relay 39 connects the pilot motor 42 to a source of supply 43 for one direction of rotation and the closure of the relay 41 connects the pilot motor 42 to the source of supply 43 for the opposite direction of rotation. The rotation of this motor in one direction or the other gradually and continuously raises or lowers the voltage of the generator 10 by controlling the strengths of its fields 44 and 45. The strength of the field 44 is controlled through a rheostat 46 connected in series therewith, and the strength of the field 45 is controlled by controlling through the agency of a tap switch 47 the number of its turns connected in the load circuit 12, 13. Thus, in the arrangement illustrated in the drawing the rotation of the motor 42 in a clockwise direction gradually decreases the strength of the field 44 to a point where all of the resistance 46 is connected in circuit with the field 44, at which time the switch 47 is operated to decrease the number of turns of the series winding 45 connected in the load circuit 12, 13, and the rotation of the motor 42 in a counterclockwise direction gradually increases the strength of the field 44 to a point where all of the resistance 46 has been removed from the circuit of the field 44 at which time the switch 47 is operated to increase the number of turns of the series winding 45 connected in the load circuit. The operation of the tap switch 47 in this manner is accomplished through the agency of a Geneva movement 48 by which switch arm 49 is moved over the switch segments 50. Each segment 50 is connected to taps on the series field winding 45 of generator 10. In the particular arrangement illustrated arm 49 also operates limit switches 51 and 52 which open the circuit of motor 42 after it has operated the field control mechanism of the generator 10 to either of its extreme positions.

In the drawing winding 44 of the generator 10 is illustrated as a separately excited winding. This requires a separate source of supply 43 which, in many instances, may not be available. To avoid this difficulty a generator such as disclosed in Patent No. 1,340,004, S. R. Bergman, May 11, 1920, may be used, in which case the field 44 will be connected across the substantially constant potential supply existing between one of the load brushes and the auxiliary brush of said generator. It is, of course, within the scope of my invention to use any type of generator suitable for supplying the load connected thereto through the load circuit 12, 13.

The system disclosed is primarily intended for operation in which the motor generator 11, 10 is started, controlled and stopped by the operator's manipulation of the electrode 14 into and out of engagement with the work 15. The system may also be started by closing switch 53 and stopped by opening switch 54.

The construction of the system will be further described in connection with its operation.

In the drawing the various parts have been illustrated in the positions they assume when deenergized.

If the operator wishes to start the motor generator set 11, 10 he can do so by touching the electrode 14 to the work 15. This completes the secondary circuit of the transformer 16 causing an increased flow of current in the primary circuit 17 thereof, and this increased flow of current operates relay 19 to close its contacts 21. The closure of contacts 21 completes the circuit of the operating coil 22 of switch 23 as follows:— From one terminal of the source of supply 18 through conductor 55, contacts 21 of relay 19, conductors 56 and 57, coil 22 of switch 23, and one of the conductors 24 to another terminal of the source of supply 18. The closure of switch 23 completes a circuit through its holding contacts 25 which connects relay 27 to the source of supply 18 through rectifier 28 as follows:— From one terminal of the source of supply 18 through one of the conductors 24, contacts 25, switch 54, conductors 58 and 59, contacts 29 of relay 30, rectifier 28 and conductor 61 to another terminal of the source of supply 18. The connection of the rectifier 28 to the source of supply 18 energizes the operating coil of the relay 27 through conductors 62 by which it is connected to the direct current terminals of the rectifier 28. The closure of contacts 25 also completes a holding circuit for switch 23 as follows:—From one terminal of the source of supply 18 through one of the conductors 24, contacts 25, switch 54, conductor 58, contacts 26 of relay 27, conductor 57, coil 22 of switch 23 and another of the conductors 24 to another of the conductors of the source of supply 18.

As soon as the voltage of the generator 10 builds up to an operating value, if the operator removes the electrode 14 from the work 15, without striking an arc, the relay 30 will operate opening contacts 29 thereby deenergizing the relay 27. After relay 27 has been deenergized for a predetermined length of time, depending upon its setting, it will open its contacts 26 and thus open the holding circuit of the switch 23, which upon opening disconnects the motor 11 from the source of supply 18. The operation of the relay 27 thus determines the period of time the welding set 11, 10 will operate if no load is imposed on the generator 10. If a load is imposed on the generator 10 by striking and maintaining a welding arc within the time interval determined by the relay 27, relay 30 will then reestablish the circuit of this relay through contacts 29 and no shut down will occur.

If upon initiating a welding arc the operator finds the voltage of the generator 10 too high or too low he can alter this voltage without returning to the set simply by touching electrode 14 to the work 15 a predetermined number of times, and then maintaining the welding circuit open for a period of time sufficient in his estimation to permit the desired change to be accomplished. Then by again touching the electrode to the work this voltage adjustment may be terminated and the operator can again strike his arc at a new voltage which if not suitable can again be raised or lowered as just described. This remote control is obtained through the action of relay 19 and positioning relay 33. Depending upon the position to which relay 33 is operated by relay 19 the motor 42 is energized to operate the field control mechanism of the generator to raise or lower its voltage. Thus, in the arrangement illustrated, if the operator twice momentarily touches the electrode 14 to the work 15 the relay 33 will complete a circuit by means of which the voltage of the generator 10 is increased and, if the operator touches the electrode 14 to the work 15, five times, the relay 33 will be operated to a position in which it completes a circuit by means of which the voltage of the generator 10 is decreased.

Each time the operator touches the electrode 14 to the work 15 the relay 19 operates and closes its contacts 31 which complete the circuit of the operating coil 32 of relay 33 as follows:—From one of the direct current terminals of the rectifier 34 through conductors 63 and 64, contacts 31 of relay 19, conductor 65, coil 32 of relay 33 and conductor 66 to the other direct current terminal of the rectifier 34. The energization of coil 32 attracts an armature 67 of relay 33 against the bias of a spring 68 and operates a ratchet wheel 69 through the agency of a pawl 70 spring pressed into engagement therewith. Movement of the ratchet wheel 69 moves the contact 69' of the relay 33 to definite positions depending upon the number of times the operating coil 32 of the relay has been energized. The ratchet wheel 69 is held in its final position by means of a pawl 71 which is pressed into engagement therewith by a spring 72.

The relay 33 is reset by moving the pawl 71 out of engagement with the ratchet wheel 69 and allowing the contact to return to its initial position under the action of a biasing spring 73. The relay 33 is reset when its coil 37 is energized by the closure of contacts 36 of relay 30. The closure of these contacts completes the operating circuit of coil 37 as follows:—From one direct current terminal of the rectifier 34 through conductors 63 and 74, contacts 36 of relay 30, conductor 75, operating coil 37 of the relay 33 and conductor 66 to the other direct current terminal of the rectifier 34. When the coil 37 is energized it attracts its armature 76 moving pawl 71 out of engagement with the ratchet wheel 69.

As has been pointed out above, the relay 30 has an instantaneous pick-up and a time delay drop-out characteristic. It is necessary that this delayed drop-out be greater than the time interval between the successive closings of the load circuit 12, 13 used for controlling the voltage of the generator 10. As has been pointed out above, each time the electrode 14 engages the work 15 the relay 19 operates and in turn operates relay 33 to move its contact 69' to certain definite positions depending upon the number of times the electrode 14 has been touched to the work 15. Each time the electrode is touched to the work 15 the relay 30 tends to take the positions illustrated in the drawing in which it would energize the reset coil 37 of relay 33, but before this can happen the circuit 12, 13 is again opened, again energizing the coil 30 and holding it in the position it assumes on normal voltage open circuit conditions of the load circuit. If, however, the electrode 14 is maintained in engagement with the work 15 a short predetermined length of time longer than the time delay drop-out characteristic of relay 30 its contacts 36 will be closed and relay 33 will be reset due to the energization of its reset coil 37 through the circuit including contacts 36. Thus, since the period during which the field control mechanism is operated is terminated by touching the electrode 14 to the work 15 for a short definite period of time, the operator can obtain any desired change in the voltage of the generator by maintaining the electrode 14 out of engagement with the work 15 for a period of time considered by him sufficient to accomplish this result after making the desired number of momentary closures of the circuit required to raise or lower the voltage of the generator.

As has been pointed out above, if the operator touches the electrode 14 to the work 15 five times in order to decrease the voltage of the generator, relay 33 will be operated to a position in which it completes a circuit to relay 41 through its contacts 69' and 40, as follows:—From one direct current terminal of the rectifier 34 through conductor 63, contacts 69' and 40 of relay 33, conductor 77, the operating coil of relay 41, and conductor 66 to the other direct current terminal of the rectifier 34. The operation of relay 41 completes a circuit to motor 42 through its contacts 78 as follows: From one terminal of the source of supply 43 through conductor 79, contacts 78 of relay 41, conductor 80, limit switch 52, conductor 81, motor 42 and conductor 82 to the other terminal of the source of supply 43. When thus energized the motor 42 will be operated in a clockwise direction to decrease the field excitation of the generator 10. This is accomplished by a repeated operation of first inserting resistance 46 in series with the generator field winding 44, and then, after all of this resistance has been inserted, by operating switch 47 to cut out of the load circuit a certain number of turns of the generator series field 45.

If the welding operator desires to raise the voltage of the generator 10, this can be accomplished by twice momentarily closing the welding circuit by touching the electrode 14 to the work 15. This operates the relay 19 twice and thus in turn repeatedly energizes the relay 33 to move its contact 69' into engagement with its contact 38. The closure of these contacts completes the following control circuit:—From one direct current terminal of the rectifier 34 through conductor 63, contacts 69' and 38 of relay 33, conductor 83, the operating coil of relay 39 and conductor 66 to the other direct current terminal of the rectifier 34. The energization of relay 39 closes its contacts 84 completing the following circuit: From one terminal of the source of supply 43 through conductor 79, contacts 84 of relay 39, conductor 85, limit switch 51 (which will be closed) and a conductor 86, motor 42 and conductor 82 to the other terminal of the source of supply 43. When thus energized motor 42 will rotate in a counterclockwise direction and operate the field control mechanism of the generator 10 to increase the voltage of the generator. This voltage increasing operation will continue as long as the electrode 14 is held out of engagement with the work 15 and will be arrested when the electrode 14 is touched to the work 15 for a short period of time sufficient in length to permit the relay 30 to close its contacts 36 and complete the reset circuit of the relay 33.

It will thus be seen that the operator at his post is able to control the starting and stopping of the motor generator set 11, 10, by touching his electrode to the work or separating it therefrom for a predetermined time, and that by momentarily touching the electrode 14 to the work 15 predetermined numbers of times and then maintaining the welding circuit open for a period of time, the operator can selectively raise or lower the voltage of the generator 10 to satisfy his requirements. It is, of course, possible to select any predetermined number of momentary closures of the load circuit for raising the voltage of the generator and a different predetermined number of momentary closures of the load circuit for lowering the voltage of the generator. The time delay before shut-down of the motor generator set determined by relay 27 should be great enough to permit the operator to make the desired changes in generator voltage.

In the arrangement illustrated in Fig. 1 of the drawing the control current step by step distributor relay 33 is reset at the option of the operator. By employing an arrangement such as illustrated in Fig. 2 the voltage of the generator may be gradually varied for a predetermined interval of time not under the control of the welding operator. In this figure only a portion of the control system of Fig. 1 is shown and corresponding parts are identified by corresponding reference numerals. In place of relay 33 of Fig. 1 a relay 89 having a time delay resetting characteristic is employed for controlling the operation of the pilot motor 42 forming part of the load current adjusting means. Each time its operating winding 90 is energized by the closure of relay 19 an armature 91 engages and moves the ratchet wheel 69 in a counterclockwise direction against the bias of spring 73. At the same time an arm 92 on the armature 91 engages an operating arm 93 of a dash-pot 94 moving it out of engagement with a latch 95 which is thereupon forced into engagement with the teeth of the ratchet wheel 69 through the agency of a spring 96. After the lapse of a predetermined interval of time arm 93 of the dash-pot 94 descends, moves latch 95 against the action of spring 96 and releases ratchet wheel 69 thus permitting the contact 69' to return to its initial position in which relay 89 is inoperative for controlling the load current adjusting means. By employing an arrangement such as illustrated in Fig. 2 it is apparent that when the relay 19 is operated two or five times in succession, circuits through contacts 69', 38, or 69', 40 are completed for controlling the operation of the pilot motor 42, and that these control circuits are maintained for a period of time determined by the dash-pot 94 which resets the relay 89 after the lapse of a predetermined interval of time. When the system of Fig. 1 is modified in accordance with the arrangement shown in Fig. 2, the period of time during which the voltage of the generator is gradually raised or lowered is not under the control of the welding operator and in order to secure a desired raising or lowering of the voltage of the generator, it may be necessary for the operator to repeat the operation by which the voltage is raised or lowered by touching the electrode to the work a predetermined number of times.

It is apparent that the system illustrated may be variously modified without departing from the spirit and scope of my invention. For example, a current responsive relay may be used in place of the voltage relay 30 to accomplish the desired control under normal voltage open circuit conditions and short circuit or operating load conditions. Furthermore, it is not necessary to employ rectifiers as illustrated since properly designed relays may be directly connected to the available source of supply. In the particular system illustrated direct current relays were available for the service demanded of relays 27 and 33 of the system illustrated and, consequently, these relays were supplied with direct current through rectifiers connected to the available alternating current source of supply.

It is also apparent that the control system described above may be used for altering any characteristic of a source of supply and is not limited to a voltage control system such as illustrated. The principles involved in the system described are of general application and may be adapted to varying conditions without departing from my invention. Obviously various modifications may be made in the circuits employed as well as the apparatus employed without departing from my invention, and I aim in the appended claims to cover all such modifications as fall within the true spirit and scope of my invention.

What I claim as new and desire to secure by Letters Patent of the United States, is:

1. A power system comprising a generator, a load circuit connected to said generator, means for gradually and continuously varying the voltage of said generator, a circuit arranged to energize said voltage varying means to raise the voltage of said generator, a second circuit arranged to energize said voltage varying means to lower the voltage of said generator, a relay arranged to complete and maintain the energization of one or the other of said circuits depending on the number of times it has been energized, a second relay responsive to the impedance of said load circuit arranged to effect the energization of said first mentioned relay, and means including a third relay responsive to the closure of said load circuit for a predetermined interval of time for resetting said first mentioned relay and for de-energizing said circuits for said voltage varying means.

2. A power system comprising a generator, a load circuit connected to said generator, a relay operable to a position for raising the voltage of said generator and to another position for decreasing the voltage of said generator depending on the number of times it has been energized, a source of alternating current supply, a transformer having its secondary connected in said load circuit and its primary circuit connected to said source of alternating current supply, and a relay connected in the primary circuit of said transformer and arranged to complete the operating circuit of said first mentioned relay.

3. A power system comprising a generator, a load circuit connected to said generator, a motor mechanically connected to said generator, and means responsive to the short circuiting of said load circuit for starting said motor, said means including a relay having control contacts and an operating winding, a control circuit for said motor, said circuit including the control contacts of said relay, a source of alternating current supply, and a transformer having its secondary winding connected in said load circuit and its primary winding connected in series circuit with the operating winding of said relay to said source of alternating current supply.

4. A power system comprising a generator, a load circuit connected to said generator, a motor mechanically connected to said generator, a source of supply, a switch arranged to connect said motor to said source of supply, an operating winding for said switch, a holding circuit for the operating winding of said switch, a time element relay arranged to open said holding circuit after the lapse of a predetermined time, and a second relay arranged to initiate the opening of said time element relay when said generator has attained an operating voltage and said load circuit is open.

5. A power system comprising a generator, a load circuit connected to said generator, a motor mechanically connected to said generator, a source of alternating current supply, a switch arranged to connect said motor to said source of supply, an operating winding for said switch, a transformer having its secondary winding connected in said load circuit and its primary connected to said source of supply, a relay having its operating winding connected in the primary circuit of said transformer and having its control contacts in a circuit for the operating winding of said switch, a holding circuit for the operating winding of said switch, a time element relay arranged to open said holding circuit after the lapse of a predetermined time, and a second relay arranged to initiate the opening of said time element relay when said generator has attained an operating voltage and said load circuit is open.

6. A power system comprising a generator, a load circuit connected to said generator, means responsive to the momentary closure of said load circuit a predetermined number of times for continuously increasing the voltage of said generator, means responsive to the momentary closure of said load circuit for a predetermined different number of times for continuously decreasing the voltage of said generator, and means responsive to the closure of said load circuit for a predetermined interval of time for deenergizing said two last mentioned means.

7. A power system comprising a generator, a load circuit connected to said generator, means including a control circuit for varying a characteristic of said generator, means including a second control circuit for reversely varying said characteristic of said generator, a relay arranged when energized a predetermined number of times to complete and maintain the energization of said first control circuit and arranged when energized a different predetermined number of times to complete and maintain the energization of second control circuit, means responsive to the momentary closure of said load circuit for operating said relay, and means responsive to the closure of said load circuit for a predetermined interval of time for resetting said relay and for deenergizing said control circuits.

8. A power system comprising a generator, a load circuit connected to said generator, a motor mechanically connected to said generator, a source of alternating current supply, a switch arranged to connect said motor to said source of supply, an operating coil for said switch, a relay operable to a position for raising the voltage of said generator and to a different position for lowering the voltage of said generator depending on the number of times it has been energized, an operating coil and a reset coil for said relay, a second relay arranged to complete a circuit for the operating coil of said switch and to energize the operating coil of said first mentioned relay each time said load circuit is closed, a holding circuit for the operating coil of said switch, a time element relay arranged to open holding circuit after the lapse of a predetermined time, and a third relay arranged to initiate the opening of said time element relay when said generator has attained an operating voltage and said load circuit is open and to energize the reset coil of said first-mentioned relay when said load circuit is closed for a predetermined interval of time.

9. A power system comprising a generator, a load circuit connected to said generator, a motor mechanically connected to said generator, a source of alternating current supply, a switch arranged to connect said motor to said source of supply, an operating coil for said switch, holding contacts for said switch, a relay operable to a position for raising the voltage of said generator and to a different position for lowering the voltage of said generator depending on the number of times it has been energized, an operating coil and a reset coil for said relay, a second relay arranged to complete a circuit for the operating coil of said switch and to energize the operating coil of said first mentioned relay each time said load circuit is closed, a third relay operable to a position corresponding to open circuit normal voltage conditions on said load circuit and to another position corresponding to short circuit or normal load conditions on said load circuit, a holding circuit for the operating coil of said switch, said circuit including said holding contacts of said switch, a fourth relay having a time delay opening characteristic and arranged when energized to complete said holding circuit, and a circuit including the closed holding contacts of said switch arranged to energize said last mentioned relay and a circuit arranged to energize the reset coil of said first mentioned relay when said third mentioned relay is in the position it assumes when said load circuit is short circuited or connected to a load.

10. A power system comprising a generator, a load circuit connected to said generator, a motor mechanically connected to said generator, a source of alternating current supply, a switch arranged to connect said motor to said source of supply, an operating coil for said switch, holding contacts for said switch, a relay operable to a position for raising the voltage of said generator and to a different position for lowering the voltage of said generator depending on the number of times it has been energized, an operating coil and a reset coil for said relay, a transformer having its secondary connected in said load circuit and its primary circuit connected to said source of alternating current supply, a second relay connected in the primary circuit of said transformer and arranged to complete a circuit for the operating coil of said switch and to energize the operating coil of said first mentioned relay each time said load circuit is closed, a third relay operable to a position corresponding to open circuit normal voltage conditions on said load circuit and to another position corresponding to short circuit or normal load conditions on said load circuit, a holding circuit for the operating coil of said switch, said circuit including said holding contacts of said switch, a fourth relay having a time delay opening characteristic and arranged when energized to complete said holding circuit, and a circuit including the closed holding contacts of said switch arranged to energize said last mentioned relay and a circuit arranged to energize the reset coil of said first mentioned relay when said third mentioned relay is in the position it assumes when said load circuit is short circuited or connected to a load.

GUY A. MOFFETT.